May 31, 1927

F. W. HOBAN

Re. 16,645

TELEPHONE ATTACHMENT

Original Filed July 5, 1921

2 Sheets-Sheet 1

Inventor

Fairfield W. Hoban

By Charles H. Kesler his Attorney

May 31, 1927.
Re. 16,645
F. W. HOBAN
TELEPHONE ATTACHMENT
Original Filed July 5, 1921
2 Sheets-Sheet 2
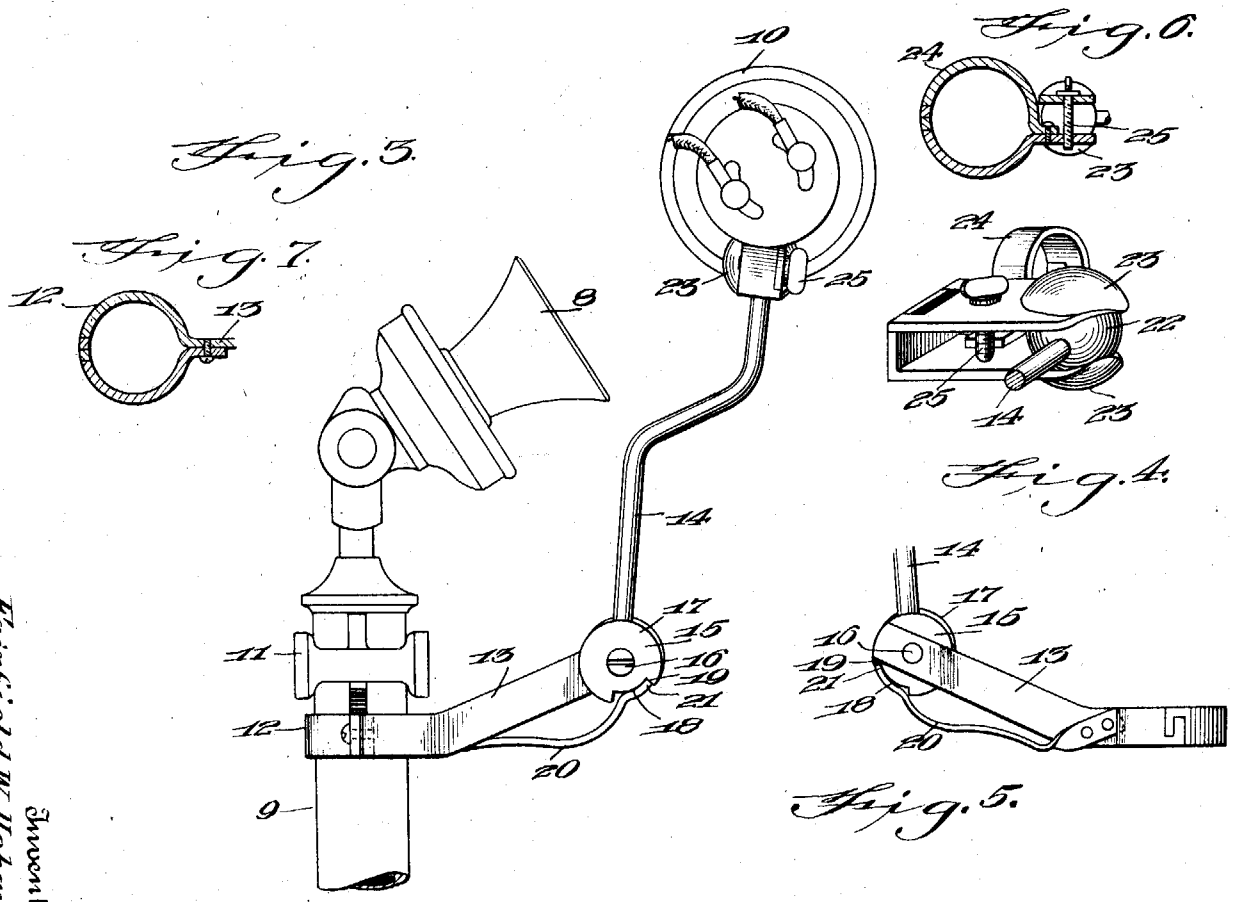
Inventor
Fairfield W. Hoban
By Charles H. Keeler
his Attorney Reissued May 31, 1927. Re. 16,645

UNITED STATES PATENT OFFICE.

FAIRFIELD W. HOBAN, OF NEW YORK, N. Y., ASSIGNOR, BY MESNE ASSIGNMENTS, TO HOLDAPHONE, INCORPORATED, OF NEW YORK, N. Y., A CORPORATION OF NEW YORK.

TELEPHONE ATTACHMENT.

Original No. 1,530,897, dated March 24, 1925, Serial No. 482,446, filed July 5, 1921. Application for reissue filed March 8, 1927. Serial No. 173,728.

The present invention relates to receiver holders for telephone instruments, the object being to provide an exceedingly simple structure that will support the receiver at the ear of the user of the instrument, thus leaving both hands free. A further object is to provide a device in which the receiver is readily adjustable to different positions, so that it may be desirably located.

Figure 2:
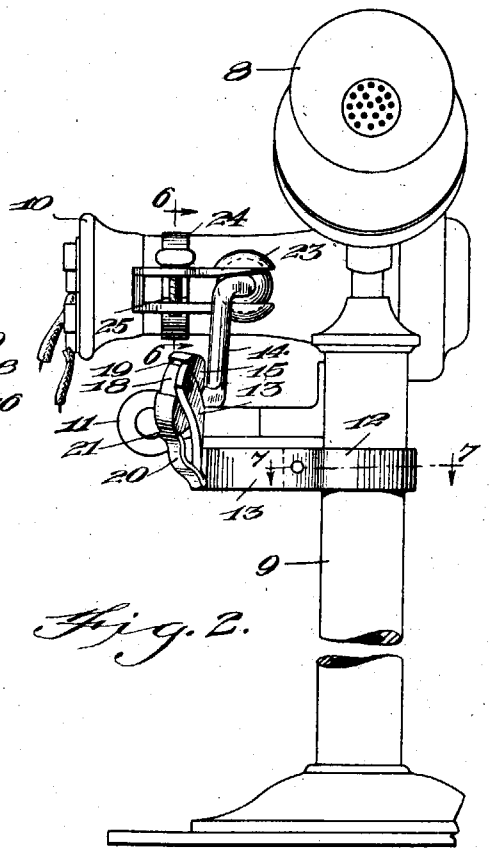
Figure 1:
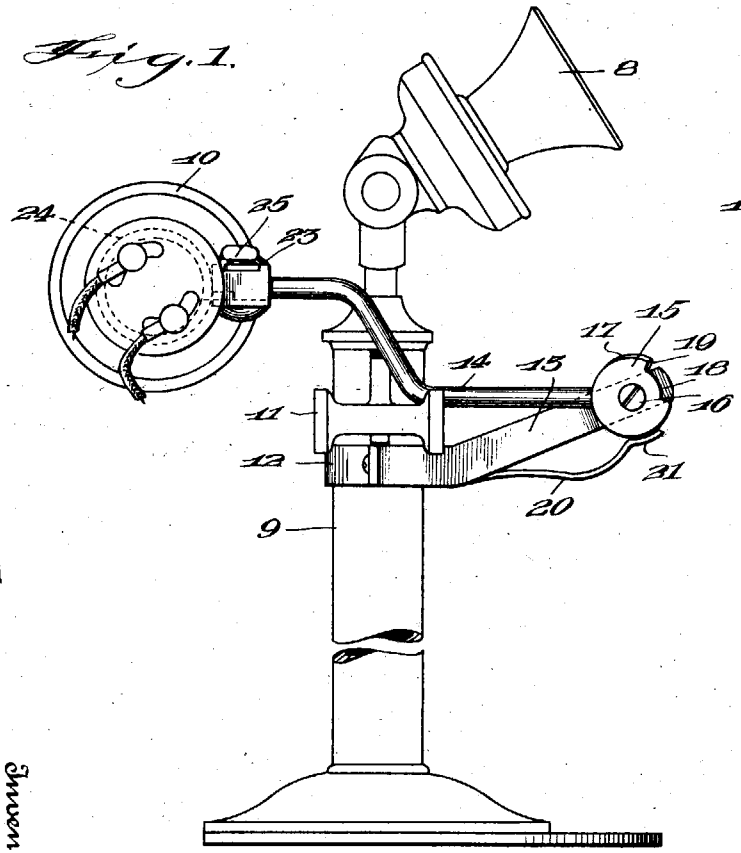

In the accompanying drawings:

Figure 1 is a side elevation of the attachment in a position to hold the usual hook down, Figure 2 is a front view of the same, Figure 3 is a side elevation with the receiver in position for use, Figure 4 is a detail perspective view of the ball and socket connection between the carrier arm and receiver bracket, Figure 5 is a view in elevation of the supporting bracket, Figures 6 and 7 are detail sectional views on the line 6—6 and 7—7 of Figure 2.

The usual desk telephone set is illustrated, the transmitter 8 being supported on a standard 9 and the receiver being designated 10. The receiver-holding hook is shown at 11.

In the embodiment of the invention disclosed a supporting bracket is employed, comprising a sectional collar 12 adapted to surround and be clamped about the standard 9 and having an angular arm 13, the outer portion of which extends forwardly and upwardly. A carrier arm 14 is provided with a head 15, pivoted as shown at 16, to the free end of the arm 13, and this carrier arm is adapted to swing between a position on the hook 11 and a position in advance of the receiver, as shown in Figure 3. The head is provided with a circular periphery 17 broken by a notch 18 forming a stop shoulder 19. A leaf spring 20, secured to the arm 13, has a curved terminal portion 21 that bears upon the curved portion 17 of the head 15, said portion 21 being adapted to drop into the notch 18 and the end being abutted against by the shoulder 19 when the carrier arm 14 is swung to its forward position, as shown in Figure 3.

The carrier arm 14 terminates at its free end in a ball 22 that is embraced and frictionally engaged by a pair of jaws 23, forming a part of the receiver supporting bracket. These jaws are mounted on a sectional ring 24 that surrounds the receiver 10. The jaws are drawn toward each other by a screw connection 25.

The jaws or concave members 23 embrace or engage the spherical member or ball 22 at opposite sides thereof and are arranged in separated relation to form an opening therebetween for the arm 14 to permit of the free universal adjustment of said members 23 on said ball 22 relative to the arm 14. The members or jaws 23 project laterally from the ball 22 to form a support for the sectional ring 24 in which the receiver is secured, and the outer end of one jaw is provided with an inwardly directed flange interengaging the outer edge of the other jaw to maintain the members 23 in separate relation. When the screw 25 is tightened the opposing jaws 23 frictionally engage opposite sides of the ball 22 and are retained thereon against removal. The ring or annular member 24 is arranged upon and transversely of the projecting portions of the jaws 23 in close relation to the upper edges thereof and in off-set relation to the ball 22 so that the plane of the inner portion of said ring is substantially tangential to and in close relation to the ball 22, whereby, when the receiver is secured in place, to position the same transversely of and directly above the end of the arm 14 and ball 22 in balanced relation thereto and as close to the ball or pivoted connection as possible.

This arrangement permits of the vertical adjustment of the receiver so that the operative end thereof swings through vertical arcs extending substantially parallel with and in close relation to the head of the person using the device and so that the operative end of the receiver as it is adjusted vertically about its pivot will not swing away from the ear of the user. Whether the outer end of the receiver is swung vertically or horizontally the radii of the arcs described thereby are substantially the same or equal because the receiver is positioned substantially at or in as close a position as possible to the pivotal connection.

It will be evident that this device can be mounted on the usual telephone instrument and the ordinary receiver can be supported thereby. When so mounted the carrier arm 14 can be swung to a rear position where it will rest upon the hook 11 and hold the same in depressed position. When swung forwardly the spring frictionally rides on the periphery 17 of the head 15, and thus affords some resistance to the movement of the arm, and the foremost position of the arm and receiver is determined by the shoulder 19 abutting against the free end of the spring. In this position the receiver is located in convenient relation to the ear of the user of the telephone, the position of the receiver being readily variable in any direction by reason of the ball and socket mounting.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A telephone attachment comprising a bracket member and means for mounting the same on a telephone instrument, a receiver carrying arm member pivoted to the bracket member and adapted to move between a position on the receiver hook and a position in advance of the same, one of said members having a head provided with a smooth friction surface terminating in a stop shoulder, and a friction spring carried by the other member and bearing against the friction surface, said spring abutting against the stop shoulder when the carrying arm is in its advance position to hold it therein and bearing againt the smooth friction surface during the travel of said arm to and when it is located on said receiver hook.

2. A telephone attachment comprising a bracket member, means for securing the same in position relative to a telephone instrument, a receiver carrying member pivoted at the lower end thereof to said bracket member, and adapted to swing about its pivot between a position on the receiver hook and a position above said pivot in advance of the same; one of said members having a friction surface adjacent said pivot terminating in a recess, and a resilient member interposed between said receiver carrying member adjacent to the pivot thereof and said bracket member and continuously bearing against said friction surface and retained under tension thereby to frictionally resist the pivotal movement of said arm as the same is swung between said positions, and adapted to be released to enter said recess as said arm is moved to its advanced position for yieldably locking the same in said position against movement towards its hook engaging position.

3. A telephone attachment comprising a bracket member, means for securing the same in position relative to a telephone instrument, a receiver carrying arm member pivoted to the bracket member and adapted to move between a position on the receiver hook and a position in advance of the same, one of said members having a head providing a friction surface terminating in a recess, and a spring carried by the other member and bearing against the friction surface of said head during the travel of said arm member between said positions, said spring being received within said recess when said arm member is in its advance position to yieldably lock the same in position against movement towards its hook engaging position.

4. A telephone attachment comprising a bracket member, means for securing the same in position relative to a telephone instrument, a receiver carrying arm pivoted at the lower end thereof to said bracket and having a cylindrical head at its pivoted end provided with a recess therein; said arm being adapted to swing about its pivot between a position on the receiver hook and a position in advance of the same, and a spring secured at one end to said bracket and having its outer end bearing against said head for resisting the movement of said arm as the same is swung between said positions; the outer end of said spring being received within said recess when said arm is in its advance position to yieldably lock the same in said position against movement towards its hook engaging position.

5. A telephone attachment comprising a bracket, a carrier arm connected thereto for movement to and from operative position, a spherical member at the outer end thereof, opposing concave members carried by and engaging said spherical member at opposite sides of said arm and separated from each other to form an opening therebetween for said arm to permit of the free adjustment of said concave members on said spherical member relative to said arm; said concave members projecting laterally from said arm to form a support lying substantially inwardly of a transverse plane tangential to said spherical member, means connecting the projecting portions of said support for frictionally retaining said concave members on said spherical member against removal, and an annular receiver holding member disposed transversely of said projecting portions in close relation to the edges thereof and having its inner portion substantially tangential to said spherical member, whereby to secure said receiver in position directly over the end of said arm in close relation to said spherical member.

6. A telephone attachment comprising a bracket, a carrier member connected thereto for movement to and from operative position, a spherical member at the outer end thereof, opposing concave members carried by and engaging said spherical member at opposite sides of said carrier member and separated from each other to form an opening therebetween for said carrier member to permit of the free adjustment of said concave members on said spherical member relative to said carrier member; said concave members frictionally engaging said spherical member and retained thereon against removal, and projecting laterally from the end of said carrier member to provide a support having the edges thereof in close relation to said spherical member, and a receiver holding member connected to said support transversely thereof and in close relation to the edges thereof, and having the plane of its inner portion substantially tangential to said spherical member, whereby to retain said receiver in position directly over the end of the carrier member in close relation to said spherical member.

7. A telephone attachment comprising a bracket, a carrier arm connected thereto for movement to and from operative position, a spherical member at the outer end of said carrier arm, opposing socket forming jaws carried by and engaging said spherical member at opposite sides of said carrier arm and separated from each other to form an opening therebetween for said carrier arm to permit of the free adjustment of said jaws relative to said carrier arm; said jaws projecting laterally from said arm, means between the projecting ends of said jaws for maintaining the same in spaced relation at said ends, means connecting the projecting portions of said jaws for frictionally retaining the same on said spherical member against removal, and a receiver holding member disposed transversely of and upon the projecting portions of said jaws at the edges thereof and in off-set relation to said spherical member, whereby to secure the receiver in position directly over the end of said arm in close relation to said spherical member.

8. A telephone attachment comprising a bracket, a carrier arm connected thereto for movement to and from operative position, a spherical member at the outer end of said carrier arm, opposing socket forming jaws carried by and engaging said spherical member at opposite sides of said carrier arm and separated from each other to form an opening therebetween for said carrier arm to permit of the free adjustment of said jaws on said spherical member relative to said carrier arm; said jaws projecting laterally from said arm to form a support having the edges thereof substantially tangential to said spherical member, a flange on the projecting end of one of said jaws interengaging the projecting end of the other of said jaws to maintain the same in spaced relation at said ends, threaded means connecting the projecting portions of said jaws for frictionally retaining the same on said spherical member against removal, and an annular receiver holding member disposed transversely of said projecting portions in close relation to the tangential edges thereof and in off-set relation to said spherical member, and having the inner portion thereof substantially tangential to said spherical member, whereby to secure the receiver in position directly over the end of said arm in close relation to said spherical member.

Signed at New York, in the county and State of New York, this 7th day of March, 1927.

FAIRFIELD W. HOBAN.